Patented Feb. 27, 1951

2,543,557

UNITED STATES PATENT OFFICE 2,543,557

PEELABLE PROTECTIVE COATING

Howard E. Smith, Briarcliff Manor, N. Y., assignor to Insl-X Corporation, Brooklyn, N. Y., a corporation of New Jersey No Drawing. Application August 19, 1947, Serial No. 769,545

4 Claims. (Cl. 260—28.5)

My invention relates to a temporary removable protective coating for various types of equipment and more particularly my invention relates to a coating composition that can be applied by various means known in the art to articles such as tools, electrical equipment, fabricated metal products, etc., to protect and preserve such products against deteriorating effects of moisture, salt spray, water, excessive ultra-violet light and the like.

This application is a continuation in part of application No. 531,285, filed April 15, 1944, now abandoned.

When goods, such as for example, electrical equipment or metal tools are shipped over an extended path of travel, it has been found desirable to protect these goods to prevent damage during transit. This protection has taken the form of the application of preformed tape to the goods, but the protection thus afforded is both difficult and time consuming to apply, insufficient in protecting against moisture and dampness and undesirable from the standpoint of the prior lubricating protection of the goods.

Further the sealing compositions used to seal the bags, wrappings or tapes applied to protect these goods crack at low temperatures of the order of 0° C. and through these cracks (which do not heal as the temperature rises) moisture penetrates with the attendant damage. The protecting tapes, wrappings, etc. also usually gradually absorb water which migrates through to the goods. These protecting wrappings when once used cannot be reused with any degree of safety and hence considerable waste occurs.

In addition to the protecting preformed tapes it has also been suggested that ethyl cellulose compounds be used for temporary removable protective coatings, but these ethyl cellulose temporary coatings have certain disadvantages, as for example, (1) in that they are applied at a relatively high temperature; (2) it is difficult to control the thickness of the film applied to the object to be protected, (3) with respect to the usage and conditions which they must undergo the ethyl cellulose compositions are not fundamentally stable; (4) the ethyl cellulose composition loses its plasticizer or liquid constituents in relatively high percentage which affects its protective characteristics.

It is the object of my invention to provide a novel composition which may be applied in the form of a coating to goods to protect it in transit.

It is a further object of my invention to provide a novel protective temporary coating for goods which will completely protect the goods against moisture, salt spray and similar deteriorating influences.

It is a further object of my invention to provide a novel protective coating compound that can fit itself to the intricate contours of a product such as an electrical device but which can be easily removed.

It is a further object of my invention to provide a novel protective coating that contains an excess of protective lubricating compound that facilitates removal of the coating and also serves to preserve and protect the equipment covered thereby.

It is a further object of my invention to provide a novel temporary protective coating which involves no solvent removal upon application.

It is a further object of my invention to provide a novel temporary protective coating which peels freely from a variety of materials ranging from metals to paper.

It is a further object of my invention to provide a novel temporary protective coating that is efficacious over a wide temperature range of from —40° C. to +85° C.

It is a further object of my invention to provide a novel temporary protective coating compound that is efficacious over a wide temperature range of from —40° C. to +85° C., and that can be remelted and reused.

Further objects of my invention will be apparent from a consideration of the description which here follows:

I accomplish the objects of my invention by providing a compound formed by reacting ethyl methacrylate polymer, monomeric acyl amide (a high melting compound), and lanolin.

The composition thus formed is plasticized with a suitable plasticizer.

This compound is thermoplastic and may be rendered molten by heating and when so liquefied it is applied to the article to be protected by dipping, spraying, brushing or any method of application of the liquid to the part or product to be protected according to the methods well known in the art.

According to the various chemical tests of the compound obtained by the reaction of the ethyl methacrylate polymer, acyl amide and the lanolin, I believe that a true reaction occurs and that a chemical compound results.

I have found that although other acrylate and methacrylate polymer compounds may be employed, the ethyl methacrylate polymer is particularly desirable because it results in a final compound or coating having an unusually high heat resistance for a product of this kind.

The protective coating composition formed thereby is of unusual value because it can be melted and a coating therefrom applied to the goods to be protected by dipping at a relatively low temperature, of the order of 150° C., so that no harmful results to the product to be protected occur because of the heat. When such a coating is formed as by dipping on goods, the coating freezes rapidly to solid form at a relatively high temperature, of the order of 90° C. This is desirable because the coating can thus withstand any high temperature encountered in the ordinary shipping or storage of goods. The protective coating composition is remarkable in that it has an extremely wide temperature range over which it fully retains all of its protective and impermeable qualities.

For example, it will not crack at a temperature of —40° F. whereas most scaling compositions will chip and crack at temperatures of the order of 0° F. This cracking is an extremely important phenomenon from the standpoint of the purposes here described since water and moisture can penetrate through such cracks. The protective coating formed from the compound of my invention is extremely tough and resistant to abrasion and while it has a strong film cohesion in itself, it has little, if any, adhesion to the surface to which it is applied. Its water absorption is extremely low as is its permeability to vapor.

Specifically the composition of my invention is formed according to the following formula

|  | Per cent |
|---|---|
| Polymerized ethyl methacrylate | 33–67 |
| Monomeric acyl amide | 33–44 |
| Lanolin | 8–20 |
| Plasticizer | 2–10 |

The ethyl methacrylate polymer, the acyl amide and the lanolin are heated together and caused to react to form the protective composition, the properties of which are described hereinabove. The amount of plasticizer employed may be varied according to the final composition desired.

By employing components in the ranges above specified, I have formed a protective coating composition which when applied in molten form will quickly harden and set to form a film-like protective coating over a product to be protected. The coating has a relatively high softening point under a load, that is the protective coating withstands a relatively high pressure, from for example, a protuberance of a tool even under conditions of elevated temperature, and thus is preeminently desirable in protecting goods in transport even under conditions of unusually high temperature. If amounts of lanolin greater than that described hereinabove are used, an excess of probably unreacted lanolin is provided which after coating appears to migrate on to the products which are coated and forms an excellent lubricating protection for the product.

Examples of acyl amides are high melting amides such as the higher fatty acid amides. Preferably the melting point of the acyl amide employed is above 80° C. Suitable higher fatty acid amides include stearamide, myristic acid amide, arachidic acid amide and palmitic acid amide.

In place of a part or all of the polymerized ethyl methacrylate there may be substituted, polymers of methyl methacrylate, propyl methacrylate, butyl methacrylate or isobutyl methacrylate or copolymers of these methacrylates with each other or with the ethyl methacrylate. However, it is preferred to employ the polymer of ethyl methacrylate for at least a portion of the methacrylate component of the composition because of the high heat resistance of the ethyl polymer.

Any of the known plasticizers may be employed. Examples of suitable plasticizers are dibutoxy ethyl phthalate tributyl phosphate, dioctyl phthalate, tricrisyl phosphate, dibutyl phthalate, etc. It is not absolutely necessary that the plasticizer be added but the composition is improved by the addition of 2–10% of plasticizer. A commercial methacrylate polymer may be employed which contains the plasticizer.

*Example 1*

One pound of lanolin is heated to a temperature of 150° C. and while maintaining the temperature at 150° C., 2 pounds of stearamide and ¼ lb. of dibutoxy ethyl phthalate are added. Three pounds of polymerized ethyl methacrylate are then added to the heated mixture and the components are thoroughly mixed. The mix is then ready to be applied to the surface to be protected or it may be cooled and stored for future use.

The thickness of the protective coating can be regulated by the control of the temperature of the coating composition and the temperature of the product which is to be coated. Thus by using relatively higher temperatures, thinner protective coatings can be applied and by the use of lower temperatures thicker coatings can be applied.

The coating formed is strongly coherent and can be removed by stripping off in the form of a single sheet after its protection job is finished and this same inherent cohesion of the material makes it freely peelable from paper or metal even where intricate convolutions are involved.

The plastic protective coating may be reused when its protecting job is finished by merely reheating it which causes it to melt. It may be then reapplied to form new protective coatings.

I may further add paraffin as an extender to the composition, the paraffin slightly reducing the tensile strength and elongation of the film but reducing its cost. Paraffin is very compatible with the methacrylate polymer lanolin compound and preserves the desirable qualities of the film.

Further, if desired, I may add inhibitors, such as chromate pigments, or I may use any of the organic or inorganic inhibitors, or metallic organic compounds such as the leaded amines dispersed through the film. When such additions are made it is desirable to employ wetting agents to effect the homogeneous dispersion. Zinc yellow is recommended as an inhibitor with the preferred mix given hereinabove.

The temporary coating has an important advantage in that it is plastic and protective in a temperature range from —40° to +160° F. The coating is resistant to salt spray and salt water and completely prevents the penetration of vapor through it.

It will be apparent to those skilled in the art that various changes can be made in the proportions given above by way of specific examples of my invention. It will be understood, however, that the materials and the corresponding properties and the basic combinations set forth are responsible for the new and unexpected results obtained. I desire to be limited not by the specific description thereof, but by the claims appended hereto.

It is to be understood that while there are a number of chemical indications pointing to the fact that a reaction takes place between the lanolin and the methacrylate polymer, that the properties of the final product here may result in whole or in part from either the blending of or the reaction of the component elements.

I have found that various oils and greases, such as for example paraffin oil, may be actually blended with the coating composition of my invention and such oils and greases protect the goods coated.

I claim:

1. A temporary protective peelable coating which can be applied in molten condition at temperatures of about 150° C., which solidifies at a temperature of about 90° C. and which can be stripped when set from irregular surfaces and which retains its protecting properties when subjected to extreme cold or high heat, consisting essentially of a composition formed by heating in admixture and above the melting point of the mixture, 8–20% of lanolin, 33–67% of a polymerized methacrylate resin in which each monomeric unit of the resin is derived from a methacrylate monomer and 33–44% of a monomeric acyl amide having a melting point of at least 80° C.

2. A temporary protective peelable coating which can be applied in molten condition at temperatures of about 150° C., which solidifies at a temperature of about 90° C. and can be stripped when set from irregular surfaces and which retains its protecting properties when subjected to extreme cold or high heat, consisting essentially of a composition formed by heating in admixture and above the melting point of the mixture, 33–67% of polymerized ethyl methacrylate, 33–44% of a monomeric acyl amide having a melting point of at least 80° C. and 8–20% of lanolin.

3. A temporary protective peelable coating which can be applied in molten condition at temperatures of about 150° C. which solidifies at a temperature of about 90° C. and can be stripped when set from irregular surfaces and which retains its protecting properties when subjected to extreme cold or high heat, consisting essentially of a composition formed by heating in admixture and above the melting point of the mixture, 33–67% of polymerized ethyl methacrylate, 33–44% of a monomeric higher fatty acid amide, having a melting point of at least 80° C., 8–20% of lanolin and two to ten per cent plasticizer.

4. A temporary protective peelable coating which can be applied in molten condition at temperatures of about 150° C., which solidifies at a temperature of about 90° C. and can be stripped when set from irregular surfaces and which retains its protecting properties when subjected to extreme cold or high heat, consisting essentially of a composition formed by heating in admixture and above the melting point of the mixture, comprising a composition formed by heating to 150° C., 33–67% of polymerized ethyl methacrylate, 33–44% of stearamide, 8–20% of lanolin and 2–10% of plasticizer.

HOWARD E. SMITH.

REFERENCES CITED

The following references are of record in the file of this patent:

UNITED STATES PATENTS

| Number | Name | Date |
| --- | --- | --- |
| 2,098,538 | Charch et al. | Nov. 9, 1937 |
| 2,137,636 | Barrett | Nov. 22, 1938 |
| 2,232,595 | Dittmar et al. | Feb. 18, 1941 |
| 2,273,780 | Dittmar | Feb. 17, 1942 |